United States Patent [19]

Frene et al.

[11] Patent Number: 5,654,956
[45] Date of Patent: Aug. 5, 1997

[54] SWITCHING NETWORK FOR INTERCONNECTING BOTHWAY INPUT/OUTPUT LINKS, USE AND METHOD OF ENLARGING SUCH A NETWORK, AND A SYSTEM INCLUDING SUCH A NETWORK

[75] Inventors: Patrick Frene, Malakoff; Pierre Parmentier, Saclay; Marc Dieudonne, Igny; René Coutin, Perros-Quirec, all of France

[73] Assignee: Alcatel CIT, Paris, France

[21] Appl. No.: 495,260

[22] Filed: Jun. 27, 1995

[30] Foreign Application Priority Data

Jun. 29, 1994 [FR] France .................................. 94 08021

[51] Int. Cl.$^6$ ...................................................... H04L 12/02
[52] U.S. Cl. ........................ 370/386; 370/400; 370/434
[58] Field of Search ............................. 370/58.1, 58.2, 370/58.3, 54, 65, 60, 60.1, 65.5, 16, 56, 94.3, 386, 400, 434, 355, 356, 360, 408; 379/269, 270, 271; 340/825.02, 825.8, 826, 827, 829; 327/407, 415

[56] References Cited

U.S. PATENT DOCUMENTS

| 3,746,796 | 7/1973 | Gebhardt | 379/271 |
|---|---|---|---|
| 4,754,478 | 6/1988 | Leibersberger et al. | 379/271 |
| 4,870,641 | 9/1989 | Pattavina | 370/60 |
| 5,123,011 | 6/1992 | Hein et al. | 370/58.1 |
| 5,353,282 | 10/1994 | Dormer et al. | 370/58.3 |
| 5,471,465 | 11/1995 | Gamm | 370/58.1 |

FOREIGN PATENT DOCUMENTS 2524243  9/1983  France .

OTHER PUBLICATIONS

*IEEE Communications Magazine*, vol. 31, No. 2, Feb. 1993, pp. 28-37, XP 000334601, E. W. Zegura, "Architectures for ATM Switching Systems".

*Primary Examiner*—Douglas W. Olms
*Assistant Examiner*—Chau T. Nguyen
*Attorney, Agent, or Firm*—Sughrue, Mion, Zinn, Macpeak & Seas

[57] ABSTRACT

The invention relates to a switching network enabling a plurality of bothway I/O links to be interconnected. In one embodiment of the invention, the network includes at least two nodes, each node possessing not more than k incident I/O points, k≧2, n sets of k extended I/O points, n≧2, and extension/concentration devices enabling each of the k incident I/O points to be connected to one of the extended I/O points of each of the n sets. Each bothway I/O link is capable of being connected to one of the incident I/O points of one of the nodes, and each node is associated with a bothway switching matrix having k I/O ports. The nodes are interconnected in pairs by first and second one-way switching matrices each having k input ports and k output ports.

6 Claims, 5 Drawing Sheets

SWITCHING NETWORK FOR INTERCONNECTING BOTHWAY INPUT/ OUTPUT LINKS, USE AND METHOD OF ENLARGING SUCH A NETWORK, AND A SYSTEM INCLUDING SUCH A NETWORK

FIELD OF THE INVENTION

The field of the invention is that of networks for transmitting data, in particular digital data. More precisely, the invention relates to a switching network for interconnecting a plurality of bothway input/output (I/O) links, i.e. links capable of conveying data at a predetermined data rate and in full duplex.

There are numerous uses for the network of the invention, for example as a medium for asynchronous transfer mode (ATM) cell traffic.

More generally, the network of the invention can be used to convey any type of data.

BACKGROUND OF THE INVENTION

Conventionally, switching networks have been made up of a plurality of switching matrix stages. Such switching networks known in the state of the art suffer from numerous drawbacks. Generally, they run the risk of blocking, i.e. there is a risk that it can be impossible to find a path between bothway I/O links both possessing the passband required for establishing a given connection.

If it is desirable to avoid such risks of blocking, then the intermediate stages of such known networks must be numerous and they must include high numbers of switching matrices and of links between the matrices. Such networks are therefore expensive in matrices and in links between matrices.

Because of the high number of stages to be passed through, the time required for switching between two bothway I/O links is long.

Furthermore, such known networks make routing complex because of the plurality of potential paths that exist between two bothway I/O links.

In addition, to accommodate traffic unbalances, such known networks require traffic to be distributed.

Finally, the enlargement or "growth" of known networks requires at least partial rewiring of the component elements of the network that is to be enlarged. In other words, known networks are not easily extended.

OBJECTS AND SUMMARY OF THE INVENTION

A particular object of the invention is to mitigate these various drawbacks of the state of the art.

More precisely, one of the objects of the present invention is to provide a switching network which is cheap in numbers of matrices and of links between matrices.

Another object of the invention is to provide such a network which presents routing that is simple and without blocking.

Another object of the invention is to provide such a network which presents short transit times.

An additional object of the invention is to provide such a network which can be extended easily, without requiring the existing network to be rewired.

According to the invention, these various objects, together with others that appear below, are achieved by means of a switching network enabling a plurality of bothway I/O links to be interconnected, said network comprising at least two nodes, each node possessing not more than k incident I/O points $k \geq 2$, and n sets of k extended I/O points, $n \geq 2$, and comprising extension/concentration means enabling each of the k incident I/O points to be connected to one of the extended I/O points of each of the n sets, each bothway I/O link being capable of being connected to one of the incident I/O points of one of said nodes;

each node being associated with a bothway switching matrix having k I/O ports, each of the k I/O ports of a given bothway switching matrix being connected by an intermediate bothway link to one of the k extended I/O points of the same set of the node associated with said given bothway switching matrices; and said nodes being interconnected in pairs, any first and second nodes being interconnected via a first one-way switching matrix and a second one-way switching matrix each having k input ports and k output ports;

each of the k input ports of the first one-way switching matrix being connected by a respective intermediate one-way link to one of the k extended I/O points of a given set of the first node, at each of its k output points being likewise connected to the second node;

each of the k input ports of the second one-way switching matrix being connected by a respective intermediate one-way link to one of the k extended I/O points of a given set of the second node, at each of its k output points being likewise connected to the first node.

Thus, each of the k incident I/O points is connected to n extended I/O points where n is the order of extension of each of the k incident I/O points. The term "bothway switching matrix having k I/O ports", is used to mean a "folded" matrix in which each of the k I/O ports can be connected to any one of the k I/O ports.

Similarly, the term "one-way switching matrix having k input ports and k output ports" is used to mean an "unfolded" matrix such that each of its input ports can be connected to any one of its k output ports.

The network of the invention is such that there exists a single path between any two bothway I/O links. In other words, routine is very simple and the network is non-blocking.

Each path between two bothway I/O links passes via a single switching matrix (i.e. a bothway matrix if both bothway I/O links are connected to the same node, or a one-way matrix (different in each direction) if they are connected to two distinct nodes). Consequently, the transit time is very short (equivalent to the transit time through two "conventional" switching matrix stages). There is a reduction in the number of switching matrices and of intermediate links (which are either bothway links between a bothway matrix and a node, or else one-way links between a one-way matrix and a node). The network of the invention is thus cheaper than "conventional" staged networks.

The network of the invention can also accommodate traffic unbalance without prior distribution of the traffic.

In a variant of the invention, the switching network comprises at least two nodes, each node possessing k' incident I/O points, $k' \geq 2$, and k sets of k' extended I/O points, $n \geq 1$, and including extension/concentration means enabling each of the k' incident I/O points to be connected to an extended I/O point of each of the n sets, each bothway I/O link being capable of being connected to one of the incident I/O points of one said nodes;

said nodes being interconnected in pairs, any first node and second node being interconnected by a bothway switching matrix having 2×k' I/O ports;

k' first I/O ports of the bothway switching matrix each being connected by a respective intermediate bothway link to one of the k' extended I/O points of a given set of the first node;

k' second I/O ports of the bothway switching matrix each being connected by a respective intermediate bothway link to one of the k' extended I/O points of a given set of the second node.

Thus, in this variant, the network comprises only one type of switching matrix, namely bothway matrices.

This variant presents the same advantages as the above-described network of the invention (non-blocking, short transit time).

However, with respect to numbers of matrices and intermediate links, this variant is less advantageous since it includes redundancy. Between two bothway I/O links there exist:

a single path if they are both connected to incident I/O points of two distinct nodes; or a plurality of paths if they are both connected to incident I/O points of the same node. Under such circumstances, there are as many possible paths as there are extensions (namely n') since each of the n pairs of extended I/O points corresponding to two incident I/O points can have its two elements connected together via respective distinct bothway switching matrices.

The invention also provides a system of at least two interconnected switching networks, at least one of the networks being a network of the invention, said networks being interconnected via at least one bothway I/O link.

The network of the invention can be used, for example, to convey ATM cells. However, it is clear that the network of the invention can convey any type of data.

The invention also provides a method of enlarging such a network enabling additional bothway I/O links to be connected firstly to one another and secondly to the bothway I/O links that are already connected to said network.

For the first-described network of the invention, the enlargement method comprises adding:

an additional node, each incident I/O point of said additional node being capable of being connected to one of the additional bothway I/O links;

an additional bothway switching matrix associated with said additional node; and between said additional node and each already existing node, an additional first and an additional second one-way switching matrix.

In the variant network of the invention, the enlargement method comprises adding:

an additional node, each incident I/O point of said additional node being capable of being connected to one of the additional bothway I/O links; and between said additional node and each already existing node, an additional bothway switching matrix.

Consequently, in either case, the network can be enlarged without requiring any rewiring of the portion that already exists.

BRIEF DESCRIPTION OF THE DRAWINGS

Other characteristics and advantages of the invention appear on reading the following description of two preferred embodiments of the invention, given as non-limiting and indicative examples, with reference to the accompanying drawings, in which.

MORE DETAILED DESCRIPTION

Thus, the invention relates to a switching network serving to interconnect a plurality of bothway I/O links. The description belows relates to two embodiments.

Figure 1:
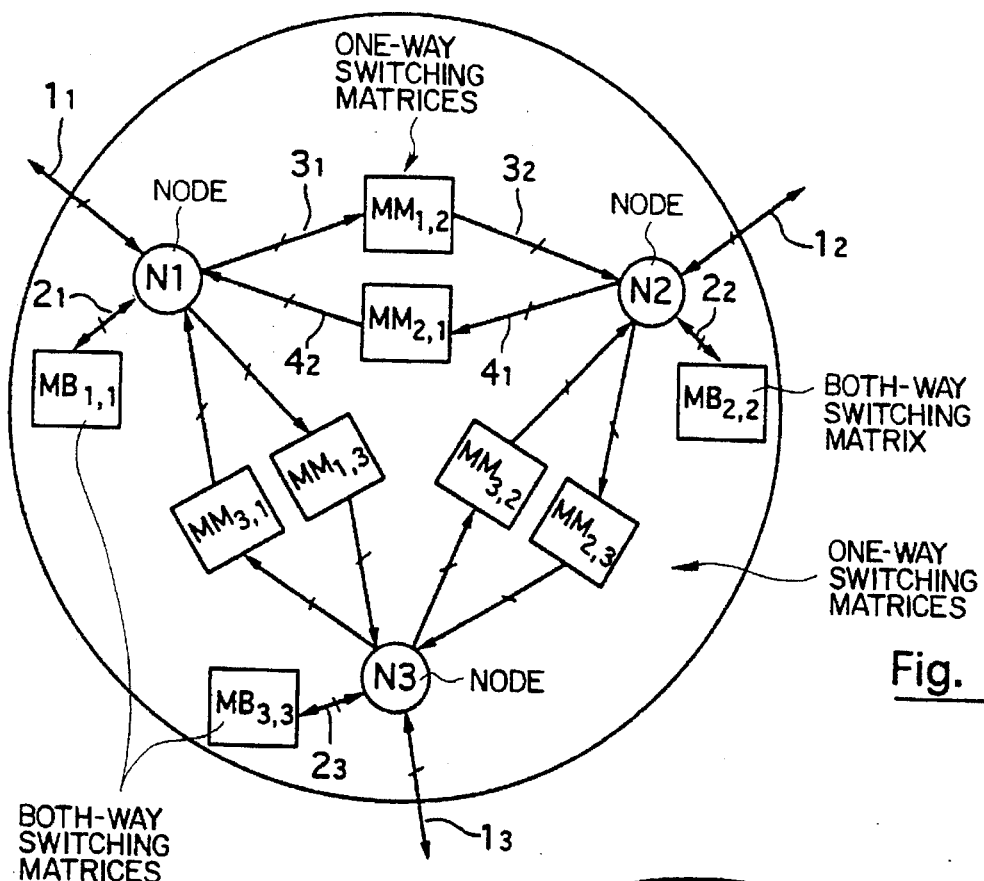
FIGS. 1 and 2 are respective diagrams of two different embodiments of a switching network of the invention.

In the first embodiment, a three-node example of which is shown diagrammatically in FIG. 1, the switching network of the invention comprises, in particular:

nodes N1 to N3;

bothway switching matrices $MB_{1,1}$, $MB_{2,2}$, $MB_{3,3}$; and one-way switching matrices $MM_{1,2}$, $MM_{2,1}$, $MM_{1,3}$, $MM_{3,1}$, $MM_{2,3}$, $MM_{3,2}$.

Figure 3:
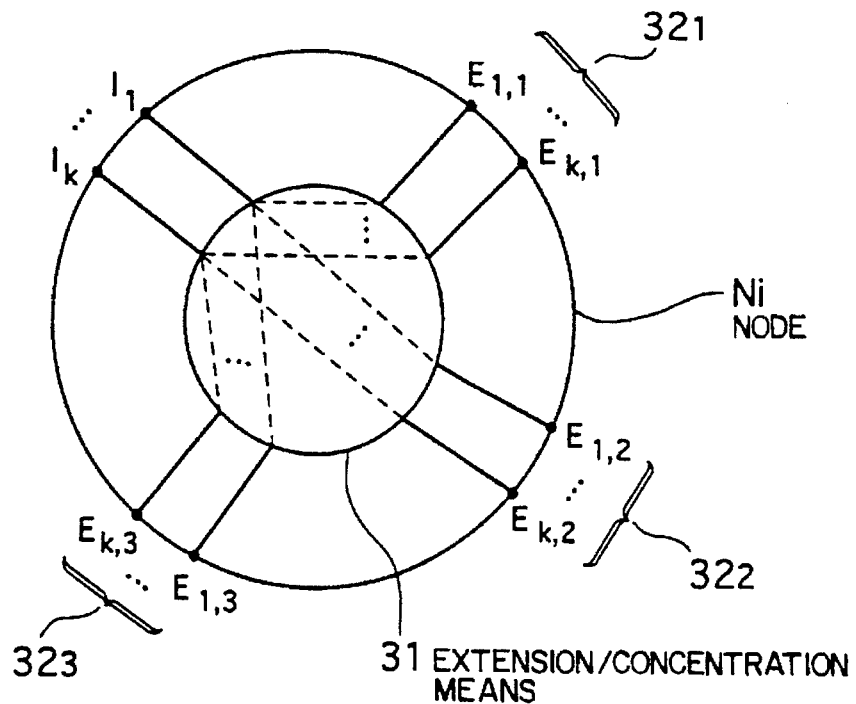
FIG. 3 is a simplified diagram of a node of the type that appears in FIGS. 1 and 2.

FIG. 3 shows an example of a node $N_i$ of the type that appears in FIG. 1. This node possesses at most:

k incident I/O points $I_1$ to $I_k$ (With $k \geq 2$); and n sets 32, e.g. $32_1$ to $32_3$ of k extended I/O points $E_{1,1}$ to $E_{k,1}$, $E_{1,2}$ to $E_{k,2}$, $E_{k,3}$ to $E_{k,3}$ (with $n \geq 2$). In the example shown, n=3.

In addition, this node $N_i$ includes extension/concentration means 31 enabling each of the k incident I/O points to be connected to one of the extended I/O points in each of the n sets $32_1$ to $32_3$ (i.e. to n extended I/O points, that is why n is generally referred to as the "order of extension").

Figure 4:
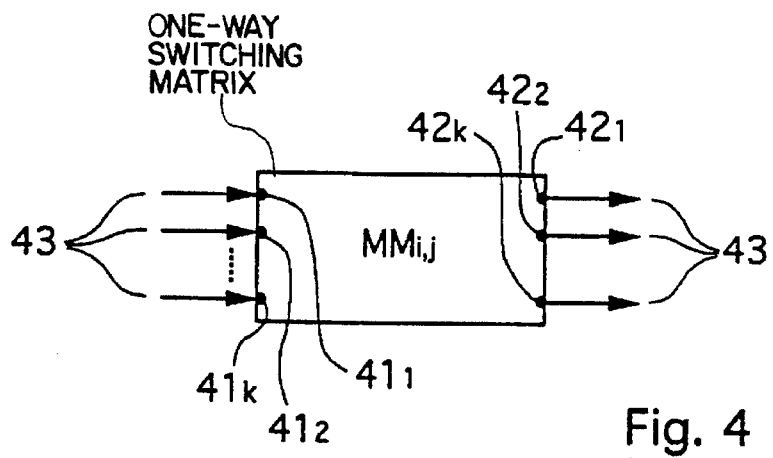
FIG. 4 is a simplified diagram of a one-way switching matrix of the type that appears in FIGS. 1 and 2.

FIG. 4 is a simplified diagram of a one-way switching matrix $MM_{i,j}$ of the type that appears in FIG. 1.

Such a one-way matrix $MM_{i,j}$ possesses k input ports $41_1$ to $41_k$ and k output ports $42_1$ to $42_k$. Each input port $41_1$ to $41_k$ can be switched to any one of the output ports $42_1$ to $42_k$. Each of the input ports and output ports is connected to a respective intermediate one-way link 43.

Figure 5:
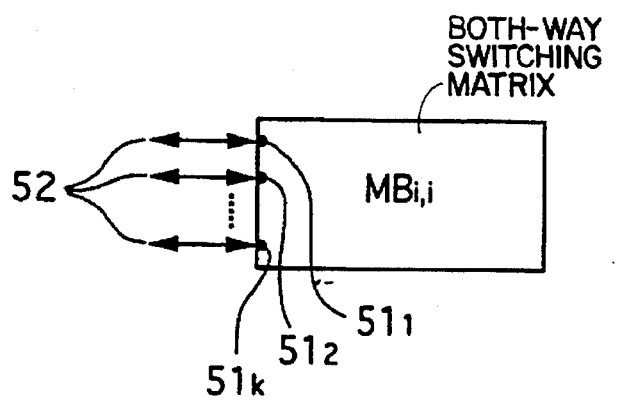
FIG. 5 is a simplified diagram of a bothway switching matrix of the type that appears in FIGS. 1 and 2.

FIG. 5 is a simplified diagram of a bothway switching matrix $MB_{i,i}$ of the type that appears in FIG. 1.

Such a bothway matrix $MB_{i,i}$ possesses k I/O ports $51_1$ to $51_k$. Each I/O port $51_1$ to $51_k$ can be switched to any other I/O port. Each of the I/O ports is connected to an intermediate bothway link 52.

The structure of the networks constituting this first embodiment is now described.

Each node N1 to N3 can receive a group $1_1$ to $1_3$ of k bothway I/O links, each of the bothway I/O links of a group $1_1$ to $1_3$ being connected to one of the incident I/O points $I_1$ to $I_k$ of the nodes N1 to N3.

In addition, each node N1 to N3 is associated with a bothway switching matrix $MB_{1,1}$ $MB_{3,3}$ having k I/O ports by a group $2_1$ to $2_3$ of intermediate bothway links 52. Each of the k I/O ports $51_1$ to $51_k$ of a bothway switching matrix $MB_{1,1}$ to $MB_{3,3}$ is connected by one of the intermediate bothway links 52 of a group $2_1$ to $2_3$ to one of the k extended I/O points $E_{1,1}$ to $E_{k,1}$, $E_{1,2}$ to $E_{k,2}$, $E_{1,3}$ to $E_{k,3}$ of the same set 32 of the node N1 to N3 associated with said matrix $MB_{1,1}$ to $MB_{3,3}$.

Finally, the nodes N1 to N3 are interconnected in pairs. There follows a description of the connections between the nodes referenced N1 and N2. It is clear that the other connections between pairs of nodes are of the same type.

The nodes N1 and N2 are interconnected as follows:

in the direction N1 to N2: a first group $3_1$ of intermediate one-way links 43, a first one-way switching matrix $MM_{1,2}$ and a second group $3_2$ of intermediate one-way links 43; and in the direction N2 to N1: the third group $4_1$ of intermediate one-way links 43, a second one-way switching matrix $MM_{2,1}$, and a fourth group $4_2$ of intermediate one-way links 43.

Each of the k input ports $41_1$ to $41_k$ and output ports $42_1$ to $42_k$ of the first one-way switching matrix $MM_{1,2}$ is connected via a respective intermediate one-way link 43 in the first or second groups $3_1$ and $3_2$, respectively, to respective ones of the k extended I/O points $E_{1,1}$ to $E_{k,1}$ of a set 32 belonging to the first node N1 or the second node N2, as the case may be.

Each of the k input ports $41_1$ to $41_k$ and output ports $42_1$ to $42_k$ of the second one-way switching matrix $MM_{2,1}$ is connected via a respective intermediate one-way link 43 in the first or second groups $4_1$ and $4_2$, respectively, to respective ones of the k extended I/O points $E_{1,1}$ to $E_{k,1}$ of the above specified set 32 belonging to the second node N2 or the first node N1, as the case may be.

Figure 6C:
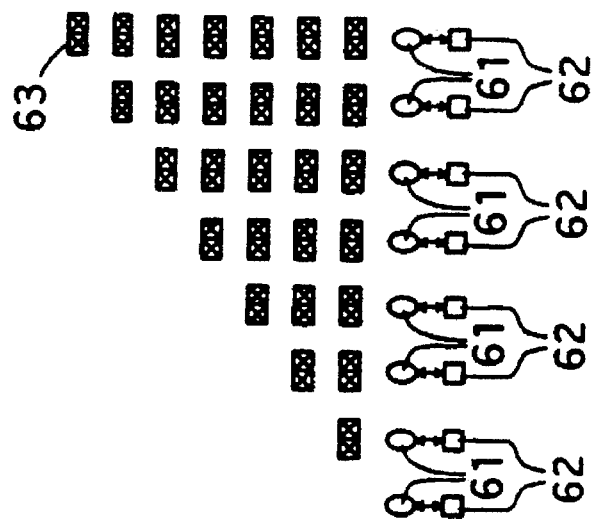
FIG. 6 shows the principle whereby a network of the invention in accordance with the first embodiment as shown in FIG. 1 can be enlarged.
Figure 6B:
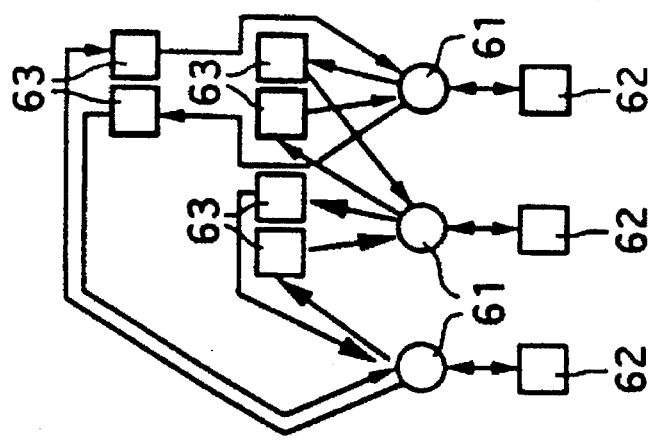
Figure 6A:
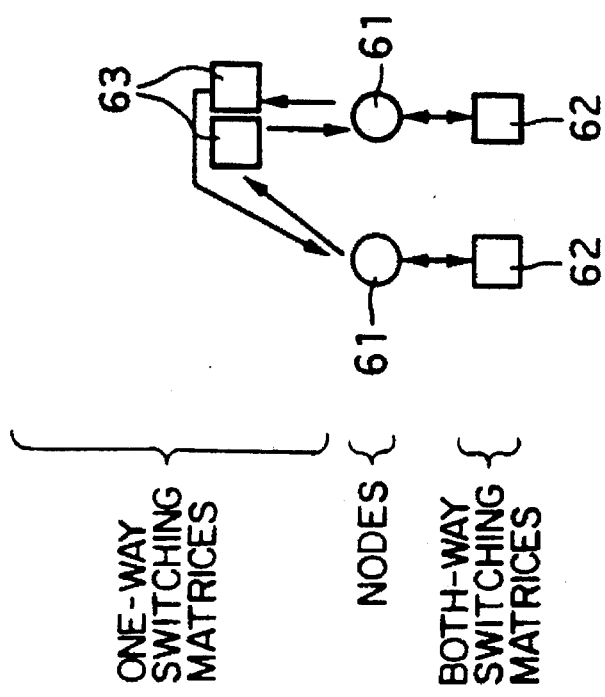

FIG. 6 shows how a network constituting a first embodiment of the invention can be enlarged. Three configurations C1 to C3 are shown that correspond to the network comprising 2, 3, and 8 nodes respectively. For simplification purposes, the groups of bothway I/O links (connected to each of the nodes) are not shown in FIG. 6.

In the first configuration C1, the network comprises two nodes 61, two bothway matrices 62, and a pair 63 comprising first and second one-way matrices.

In the second configuration C2, the network comprises three nodes 61, three bothway matrices 62, and three pairs 63 of first and second one-way matrices.

Thus, when it is desired to increase the number of bothway I/O links of the network by k, as is the case between the first and second configurations C1 and C2, the following are added:

a node 61;

a bothway switching matrix 62 associated with the added node; and between the added node and each of the existing node, a pair 63 of first and second one-way matrices.

The maximum capacity of the network, in terms of number of bothway I/O links is kxn, where:

k is the number of incident I/O points $I_1$ to $I_k$ of each node 61; and n is the order of extension. In this first embodiment, the order of extension is equal to the maximum number of nodes.

For example, if n=8, then the third configuration C3 corresponds to the maximum configuration.

Figure 8:
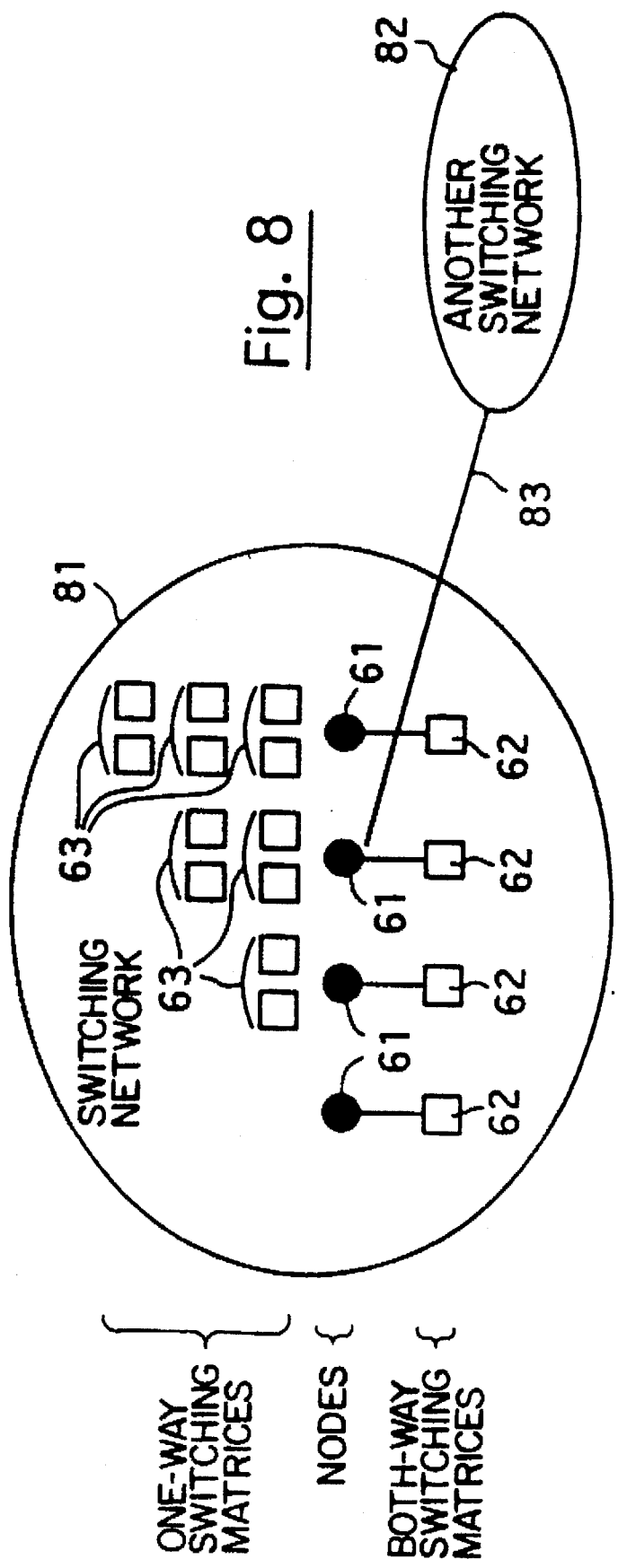
FIG. 8 shows an example of the system of the invention comprising interconnected switching networks.

FIG. 8 shows a system comprising two interconnected networks 81 and 82. One of these networks 81, is a network as described above (first embodiment of the invention). The other network 82 is a network of any kind. The two networks 81 and 82 are interconnected by at least one bothway I/O link 83.

Figure 2:
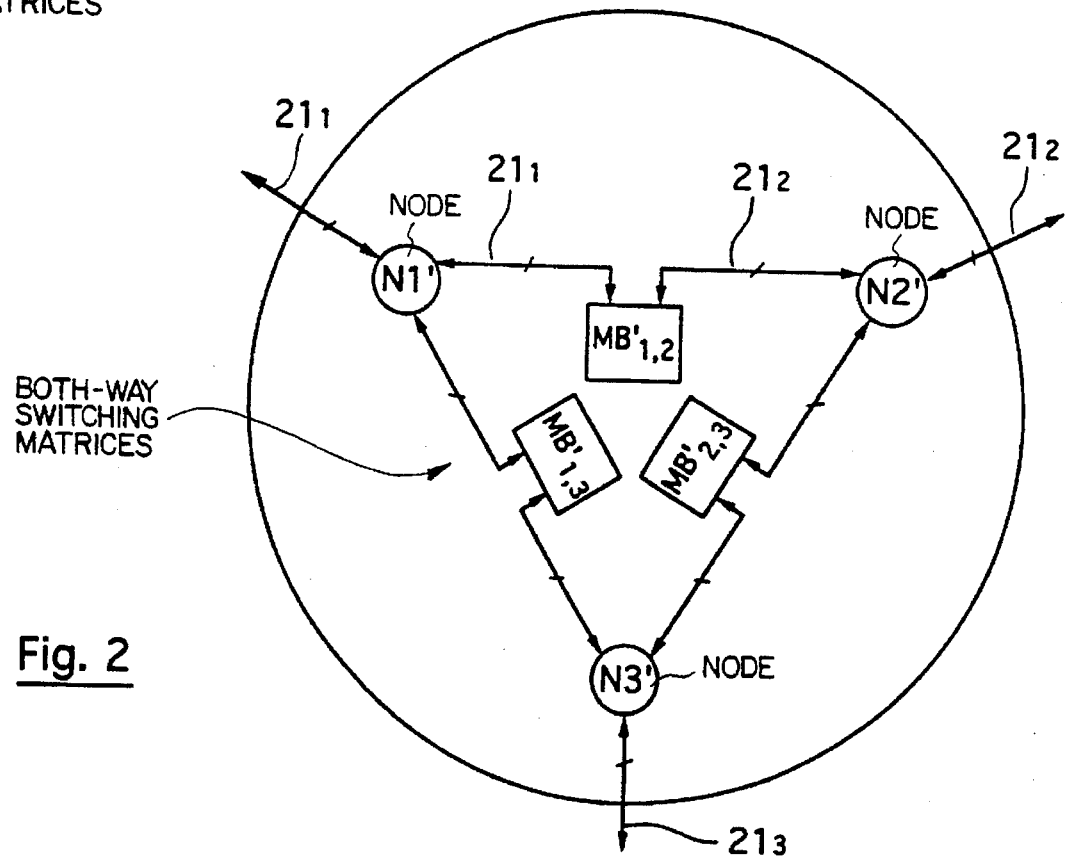

In the second embodiment, a three-node example of which is shown diagrammatically in FIG. 2, the switching network of the invention comprises, in particular:

nodes N1' to N3'; and bothway switching matrices $MB_{1,2}'$, $MB_{1,3}'$, $MB_{2,3}'$.

The nodes N1' to N3' are of the type described above with reference to FIG. 3, but with k' instead of k.

The bothway switching matrices $MB_{1,2}'$, $MB_{1,3}'$, $MB_{2,3}'$ are of the type described above with reference to FIG. 5, but with 2k' instead of k.

The structure of the network in the second embodiment is now described.

Each node N1' to N3' may receive a group $21_1$ to $21_3$ k' bothway I/O links, each of the k' bothway I/O links being connected to one of the I/O points of a group $21_1$ to $21_3$ of a node N1' to N3'.

In addition, the nodes N1' to N3' are interconnected in pairs. The description below relates solely to the connection between the nodes referenced N1' and N2', the other connections between nodes being of the same type.

The nodes N1' and N2' are connected together by a first group $21_1$ of k' intermediate bothway links 52, a bothway switching matrix $MB_{1,2}'$ (having 2×k' input ports and 2×k' output ports), and a second group $21_2$ of intermediate bothway links 52.

k' first I/O ports $51_i$, where i∈[1, k'], of the bothway matrix $MB_{1,2}'$ are each connected, by an intermediate bothway link 52 of the first group $21_1$, to respective ones of k' extended I/O points $E_{i,1}$ where i∈[1, k'], of a set 32 of the first node N1'.

k' second I/O ports $51_i$, where i∈[k'+1,2k'], of the bothway matrix $MB_{1,2}'$ are each connected, by an intermediate bothway link 52 of the second group $21_1$, to respective ones of k' extended I/O points $E_{i,1}$ where i∈[1, k'], of a set 32 of the second node N2'.

Figure 7C:
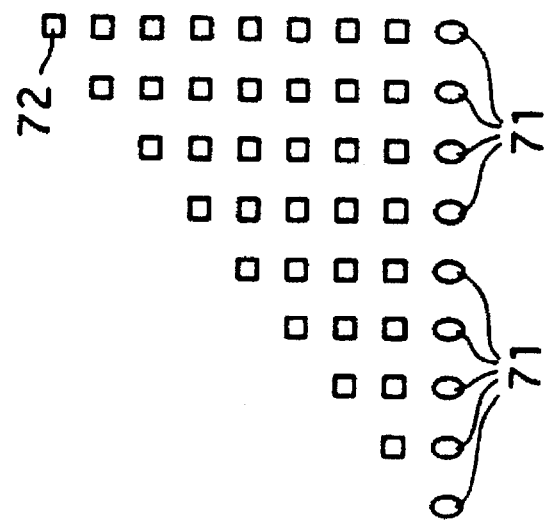
FIG. 7 shows the principle whereby a network of the invention in accordance with the first embodiment as shown in FIG. 2 can be enlarged.
Figure 7B:
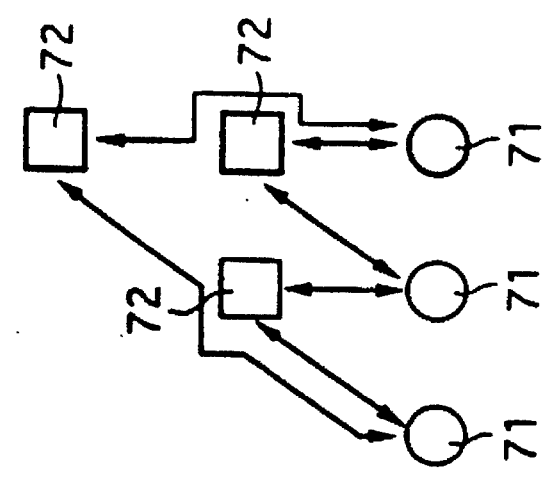
Figure 7A:
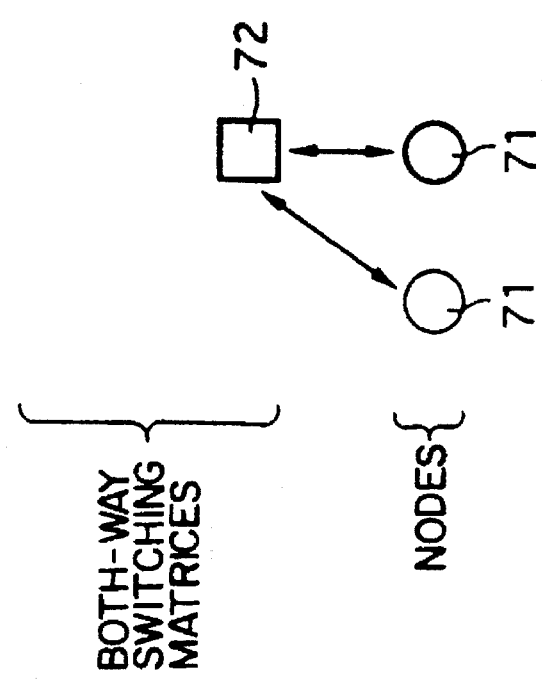

FIG. 7 shows how a network constituting the second embodiment of the invention can be enlarged. Three configurations C1' to C3' are shown that correspond to the network comprising 2, 3, and 9 nodes, respectively. In order to simplify this figure in the same manner as FIG. 6, the groups of bothway I/O links (each connected to one of the nodes) are not shown.

In the first configuration C1', the network comprises two nodes 71 and one bothway matrix 72.

In the second configuration C2', the network comprises three nodes 71 and three bothway matrices 72.

Thus, when it is desired to increase the number of bothway I/O links of the network by an amount k', as occurs when Going from the first configuration C1' to the second configuration C2', the following are added:

a node 71; and between the added node and each existing node, a bothway switching matrix 72.

The maximum capacity of the network, expressed as a number of bothway I/O links is k'×(n+1), where:

k' is the number of incident I/O points of each node 71; and n is the order of extension. In this embodiment, the maximum number of nodes is n+1.

For example, if n=8, the third configuration C3' corresponds to the maximum configuration.

Like the first embodiment network, the second embodiment network can be connected to another network of any type.

It should be observed that the first and second embodiments are based on the same principle of extending/ concentrating incident I/O points, and differ merely in the way in which networks are connected together in pairs.

It is clear that the invention also applies to the case of nodes possessing various numbers of incident I/O points and where there are various orders of extension within a given node, depending on each incident I/O point.

Under such circumstances, the network continues to be non-blocking and routing continues to be unique. However, total connectivity of the network is not necessarily guaranteed, and network enlargement no longer obeys the same rules as those given above.

We claim:

1. A switching network enabling a plurality of bothway I/O links to be interconnected, comprising:

at least two nodes, each node possessing not more than k incident I/O points $k \geq 2$, and n sets of k extended I/O points, $n \geq 2$, and comprising extension/concentration means enabling each of the k incident I/O points to be connected to one of the extended I/O points of each of the n sets, each bothway I/O link being capable of being connected to one of the incident I/O points of one of said nodes;

wherein each node is associated with a bothway switching matrix having k I/O ports, each of the k I/O ports of a given bothway switching matrix being connected by an intermediate bothway link to one of the k extended I/O points of the same set of the node associated with said given bothway switching matrices; and wherein said nodes are interconnected in pairs, any first and second nodes being interconnected via a first one-way switching matrix and a second one-way switching matrix each having k input ports and k output ports;

each of the k input ports of the first one-way switching matrix being connected by a respective intermediate one-way link to one of the k extended I/O points of a given set of the first node, at each of its k output points being likewise connected to the second node;

each of the k input ports of the second one-way switching matrix being connected by a respective intermediate one-way link to one of the k extended I/O points of a given set of the second node, at each of its k output points being likewise connected to the first node.

2. A switching network enabling a plurality of bothway I/O links to be interconnected, comprising:

at least three nodes, each node possessing k' incident I/O points, $k' \geq 2$, and n sets of k' extended I/O points, $n \geq 1$, and including extension/concentration means enabling each of the k' incident I/O points to be connected to an extended I/O point of each of the n sets, each bothway I/O link being capable of being connected to one of the incident I/O points of one said nodes; and wherein said nodes are interconnected in pairs, any first node and second node being interconnected by a bothway switching matrix having 2×k' I/O ports;

k' first I/O ports of the bothway switching matrix each being connected by a respective intermediate bothway link to one of the k' extended I/O points of a given set of the first node;

k' second I/O ports of the bothway switching matrix each being connected by a respective intermediate bothway link to one of the k' extended I/O points of given set of the second node.

3. A system comprising at least two interconnected switching networks, wherein at least one of said networks is a network according to claim 1, said networks being interconnected via at least one bothway I/O link.

4. A method of conveying asynchronous transfer mode (ATM) cells in a switching network enabling a plurality of bothway I/O links to be interconnected, the network including:

at least two nodes, each node possessing not more than k incident I/O points $k \geq 2$, and n sets of k extended I/O points, $n \geq 2$, and comprising extension/concentration means enabling each of the k incident I/O points to be connected to one of the extended I/O points of each of the n sets, each bothway I/O link being capable of being connected to one of the incident I/O points of one of said nodes;

wherein each node is associated with a bothway switching matrix having k I/O ports, each of the k I/O ports of a given bothway switching matrix being connected by an intermediate bothway link to one of the k extended I/O points of the same set of the node associated with said given bothway switching matrices; and wherein said nodes are interconnected in pairs, any first and second nodes being interconnected via a first one-way switching matrix and a second one-way switching matrix each having k input ports and k output ports;

each of the k input ports of the first one-way switching matrix being connected by a respective intermediate one-way link to one of the k extended I/O points of a given set of the first node, at each of its k output points being likewise connected to the second node;

each of the k input ports of the second one-way switching matrix being connected by a respective intermediate one-way link to one of the k extended I/O points of a given set of the second node, at each of its k output points being likewise connected to the first node, the method comprising the steps of:

conveying first ATM cells from the first node to the second node via said first one-way switching matrix; and conveying second ATM cells from the second node to the first node via said second one-way switching matrix.

5. A method of enlarging a network according to claim 1, so as to be able to connect additional bothway I/O links both to one another and to the bothway I/O links that are already connected to said network via said at least two nodes, the method comprising the steps of:

adding an additional node, each additional bothway I/O link being connected to an incident I/O point of said additional node;

adding an additional bothway switching matrix associated with said additional node; and adding an additional first and an additional second one-way switching matrix between said additional node and each already existing node.

6. A method of enlarging a network according to claim 2, so as to be able to connect additional bothway I/O links both to one another and to the bothway I/O links that are already connected to said network via said at least three nodes, the method comprising the steps of:

adding an additional node, each additional bothway I/O link being connected to an incident I/O point of said additional node; and adding an additional bothway switching matrix between said additional node and each already existing node.

* * * * *